April 6, 1937.  S. L. KERR ET AL  2,075,812
VALVE AND CONTROL THEREFOR
Filed July 20, 1934   4 Sheets-Sheet 1

INVENTORS
S. Logan Kerr
Andrew Greig
BY
ATTORNEY

April 6, 1937. S. L. KERR ET AL 2,075,812
VALVE AND CONTROL THEREFOR
Filed July 20, 1934 4 Sheets-Sheet 2

INVENTORS
S. Logan Kerr
Andrew Greig
BY
ATTORNEY

April 6, 1937.  S. L. KERR ET AL  2,075,812
VALVE AND CONTROL THEREFOR
Filed July 20, 1934  4 Sheets-Sheet 3
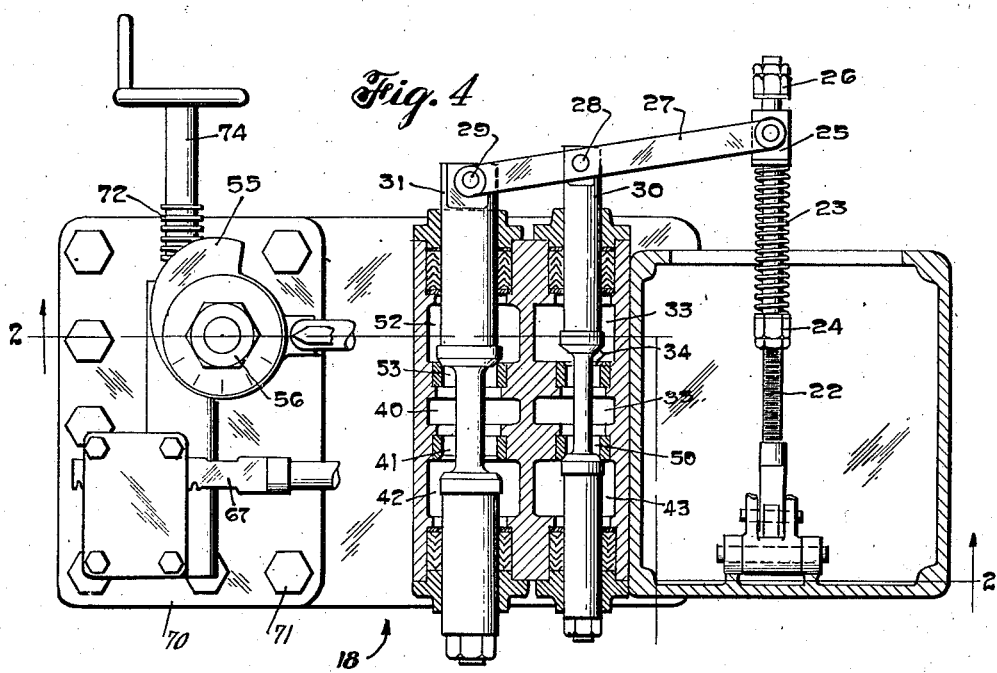
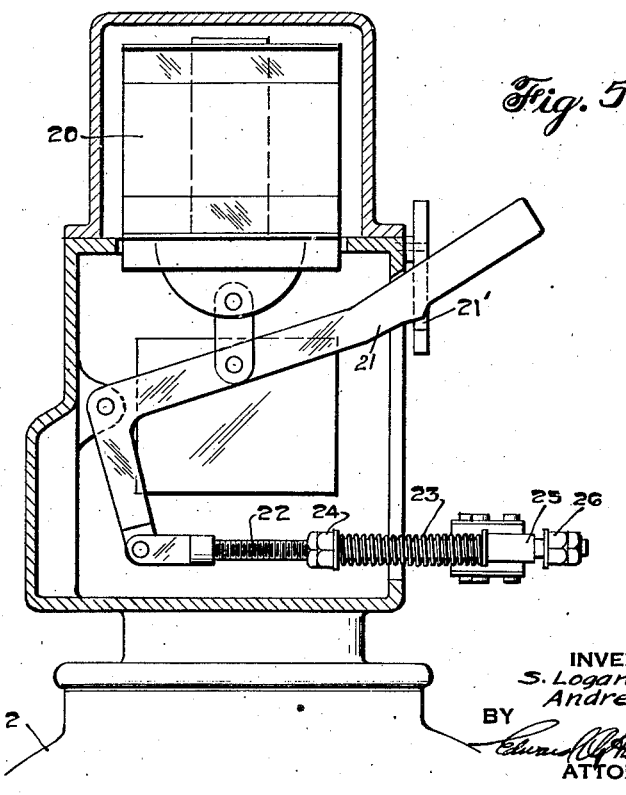
INVENTORS
S. Logan Kerr
Andrew Greig
BY
ATTORNEY

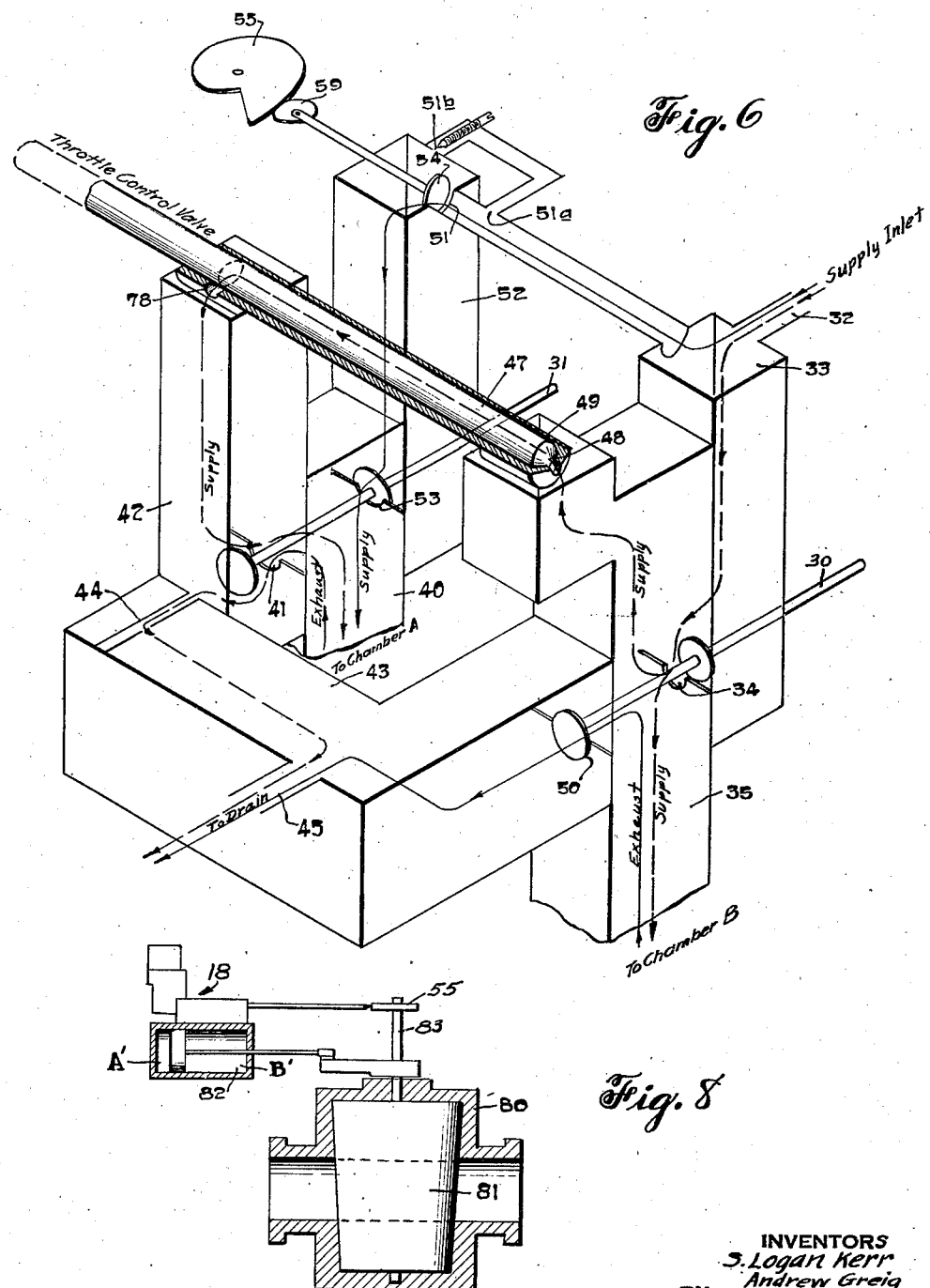

Patented Apr. 6, 1937

2,075,812

UNITED STATES PATENT OFFICE 2,075,812

VALVE AND CONTROL THEREFOR

Samuel Logan Kerr, Philadelphia, and Andrew Greig, Upper Darby, Pa., assignors to Baldwin-Southwark Corporation, a corporation of Delaware Application July 20, 1934, Serial No. 736,242

17 Claims. (Cl. 137—139)

This invention relates generally to hydraulic valve mechanisms and more particularly to an improved control therefor whereby a conduit valve is adapted to be used for either throttling, stop valve or straight check valve operation or combinations thereof.

In water works systems utilizing electric motor driven pumps, it is desirable to close a check valve automatically when the pumping operation is stopped or in the event of failure of the pump motor current.

Also in hydraulic pipe line valves (especially those adapted for water works service) such as plunger, plug or butterfly valves, it is very desirable to have a compact control mechanism together with a high degree of flexibility of operation and accessibility of parts while at the same time insuring a construction adapted for economical and standardized manufacture.

It is one object of our invention to provide an improved control for a check valve whereby upon stopping of the pump or failure of the pump motor current the check valve will close automatically. In one specific aspect of the invention we accomplish the foregoing object by the provision of an improved control valve or valves operated by a solenoid connected in parallel with the pump motor circuit whereby deenergization of the solenoid causes the control valves to initiate closing of the check valve, and if desired, the solenoid may upon reestablishment of the pump motor current become reenergized to effect opening of the check valve.

A still further object is to provide an improved control valve mechanism in combination with improved means for actuating the same to insure positive seating of preferably balanced control valves. Another object is to provide in combination with our improved control valves, means for automatically controlling the rate of opening or closing of the conduit valve, this means as specifically disclosed herein being operatively connected to the conduit valve in an improved manner. Another object is to provide improved main control valves for initiating operation of the conduit valve in combination with a retarding valve controlled in an improved manner by movement of the conduit valve. In the specific aspect of the invention we provide a plurality of auxiliary control valves one of which is adapted to function to control the rate of opening movement of the conduit valve and the other of which is adapted to control the rate of closing thereof. A more specific object in this respect is to provide improved means for adjustably coordinating the relative timing of the two auxiliary valves. A further object is to provide a conduit valve having differential fluid pressure actuating means in combination with an improved control mechanism whereby the conduit valve is automatically retarded during its opening and closing movements by controlling the supply of fluid from the larger side of said differential means.

Another object is to so construct and arrange our improved control valves that they may be disposed in a compact relatively simply control housing adapted to be readily placed preferably, but not necessarily, immediately on the conduit valve casing whereby minimum pipe connections are required while at the same time maintaining complete operative relation between the control valves and the conduit valve.

Other objects and advantages will be more apparent to those skilled in the art from the following description of the accompanying drawings in which:

Fig. 4 is a horizontal section taken substantially on the line 4—4 of Fig. 2;

Fig. 5 is an end elevation, viewed in the direction of the arrow A of Fig. 2;

Fig. 6 is a diagrammatic perspective showing the relation of the valves and passages in our improved control housing, the valves being in position to open the plunger as a straight check valve;

Fig. 8 is a diagrammatic sectional view representing broadly rotary type valves and specifically the so-called cone or plug type valve, together with our improved control system applied thereto.

Figures 1, 3:
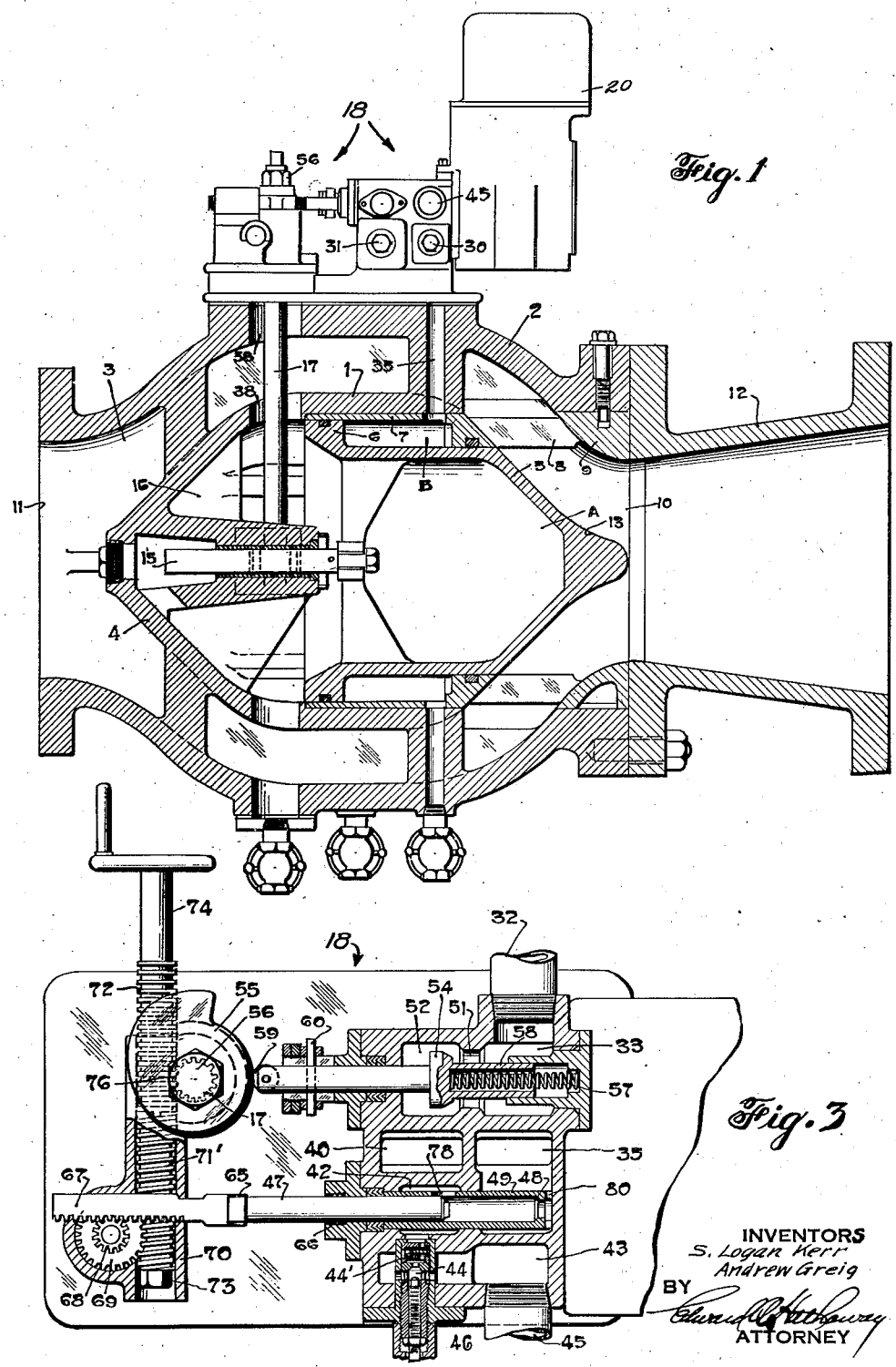
Fig. 1 is a sectional view of one form of conduit valve with our improved control valve mechanism mounted thereon.
Fig. 3 is a horizontal section taken substantially on the line 3—3 of Fig. 2.
Figures 2, 7:
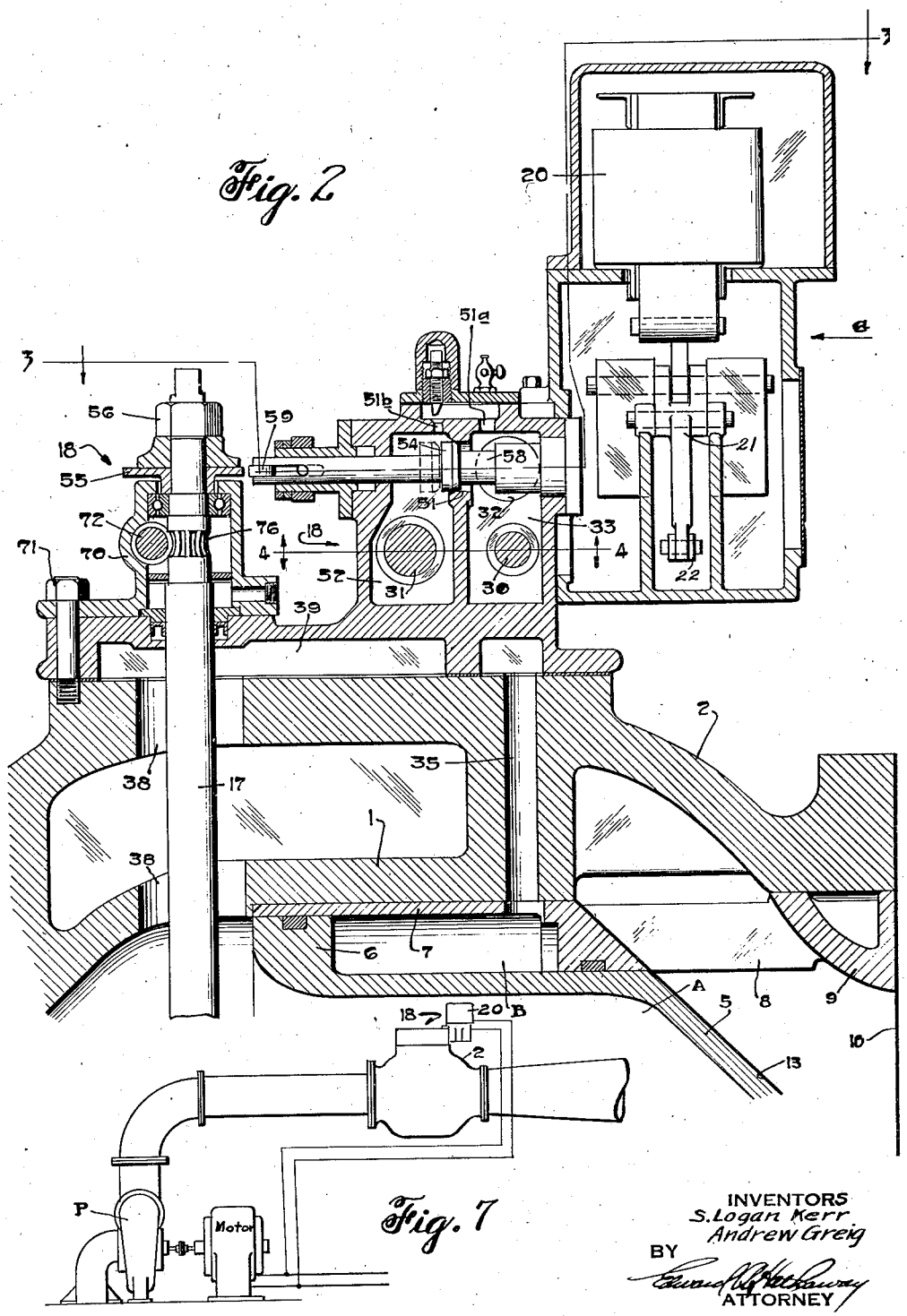
Fig. 2 is an enlarged vertical section of the upper portion of the conduit valve and the control valve mounted thereon.
Fig. 7 is a diagrammatic view showing the operative relation between the pump, pump motor and the control mechanism of the valve.

In the illustrated embodiments of the invention, which are shown herein merely for the purpose of disclosing certain specific forms among possible others that the invention might take, we provide a conduit valve of any suitable or usual type to function as a stop, check or throttling valve, and while two suitable forms of valves are disclosed herein we have preferably shown our improved control in connection with a plunger type of valve, Figs. 1 and 2, having inner and outer casings 1 and 2 held in spaced relation by suitable ribs to provide an annular fluid passageway 3. The upstream end of the inner casing 1 has preferably a conical streamlined end 4. A plunger 5 having a piston-like flange 6 is slidably supported within internal casing 1 specifically in a cylinder sleeve 7 from which plunger guide ribs 8 project forwardly to a seat ring 9. The outlet 10 is preferably but not necessarily smaller than the inlet 11. To permit a standardized size of valve to be used with pipes of different diameters, a diffuser 12 of any one of various suitable sizes is connected to either or both ends of the valve mechanism for connection to the pipe. The plunger is moved to closed position by admission of pressure to an internal chamber A and is moved to its open position by admission of pressure to an annular chamber B which in the specific embodiment of the invention may be supplemented by pipe line pressure acting on the outer surface 13 of the plunger nose, or, depending upon the type of plunger valve employed, the opening force may be obtained either solely from pressure in the annular chamber or due to the pipe line pressure acting on the plunger nose or an external source of pressure can be employed. A rack 15 is secured to the plunger through suitable ribs and is guided in a bracket 16. An indicator shaft 17 has a pinion at its lower end engaging rack 15, while the outer end of said rod projects through an improved control housing generally indicated at 18.

The structure of our improved control and the improved housing therefor may be best described in conjunction with the description of the operation of various phases of the valve.

*Straight check valve operation.*—Assuming that the pipe line is filled and plunger 5 is in its closed position and also that a pump P is not operating, then upon operation of the pump, Figs. 2 and 5, a solenoid 20 which is preferably interconnected with the pump motor circuit which broadly includes the motor controls or the main power supply will be energized simultaneously with supply of current to the pump motor. The solenoid thereupon raises a bell-crank lever 21, Figs. 4 and 5, to move a connecting rod 22 outwardly. A take-up spring 23 is interposed between an adjustable nut 24 secured to spindle 22 and a collar 25 slidably guided thereon. With the spindle 22 in its outward position as shown, a space is normally provided between collar 25 and an adjustable nut 26. Nut 26 will engage nut 25 to move the same inwardly with spindle 22 upon deenergization of solenoid 20. Pivotally secured to collar 25 is a floating lever 27 having pivotal connection at 28 and 29 to a pair of balanced control valves 30 and 31. The pivotal connections 28 and 29 are provided with sufficient clearance to compensate for the angularity of lever 27 during its movement. With the control valves in the position as shown in Fig. 4, water from the pipe line or other suitable pressure source is admitted through pipe 32, Figs. 2 and 3, into a constant pressure chamber 33. Fluid flows from the chamber 33, Fig. 4 (see Fig. 6 also) through an open valve control port 34 and thence downwardly through a vertical passage 35, Figs. 1 and 4, into chamber B to exert an opening force on the plunger. At the same time fluid pressure is discharged, Fig. 1, from the central chamber A through an opening 38 formed in one of the ribs connecting inner and outer casings 2 and 4, this chamber communicating with a passage or chamber 39 formed preferably as a recess in the control casing 18. This passage communicates with a vertical passage 40, Figs. 1, 4 and 6, and thence horizontally through an open port 41 to an exhaust chamber 42. Exhaust chamber 42 is connected to a drain chamber 43 as through a pressure reducing valve 44 and thence to a drain pipe 45. The pressure reducing valve 44 comprises a series of orifice discs with the orifices offset from each other. The orifice in the last disc is concentric to an adjustable needle valve 46 so as to form a valve seat therefor. Lateral ports 44' communicate with the interior of the reducing valve adjacent said last orifice, and this valve is inserted as a unit in the control casing. For the purpose of considering the present phase of straight check valve operation, it will be stated that a throttling control valve 47 is rendered inoperative by being held against a seat 48 formed in a sleeve 49, the operation of this valve to be described later. From the disclosure so far, it is seen that as the fluid gradually discharges from central chamber A, fluid pressure admitted to chamber B gradually moves the valve to full open position.

If the pump motor should be shut down or if the current therefor should fail, then solenoid 20 will be deenergized and the weight of its core and connecting mechanism will cause lever 21 to move downwardly and thus move spindle 22 inwardly to actuate lever 27 and reverse the positions of control valve spindles 30 and 31 from those shown in Fig. 4. A fixed fulcrum is not provided for lever 27 as the pivot pins 28 and 29 serve as fulcrums for each other after one or the other of the valves has seated. Upon said reversal of the control valves, fluid pressure is discharged from annular chamber B upwardly through passage 35 and thence horizontally through a port 50 to drain chamber 43 and pipe 45 shown in Fig. 3. Fluid pressure is admitted from inlet 32 to chamber 33 and thence laterally through a port 51 to a chamber 52. This chamber as shown in Fig. 4 extends downwardly around one end of control spindle 31 so as to admit fluid pressure through a port 53 to vertical passage 40 communicating with passage 39, Fig. 2, this passage in turn communicating with chamber 38 and the central chamber A to move the plunger in a closing direction.

During the flow of fluid pressure from inlet 32 through port 51 to chamber 52, it will be understood that a valve 54 is in its open position by reason of the fact that when the main plunger 5 was moved to its open position, rack 15 rotated indicator rod 17 and thereby turned a cam 55 through its full angular movement. This cam is angularly adjustably secured to rod 17 as by a nut 56. A spring 57 interposed between a removable guide cylinder and the stem 58 of valve 54 biases said valve to its open position and against the surface of cam 55. If desired, a small roller 59 may be journalled on the outer end of the valve stem while a guide stem 60 prevents rotation of the valve, thereby to maintain roller 59 in proper rolling contact with the pin. The cam shape is such that valve 54 may be given any desired rate and period of opening or closing in accordance with successive positions of the plunger. Considering now that plunger 5 is being moved to its closed position, then cam 55 will gradually move valve 54 to close or throttle port 51, the valve and port having a telescoping relation rather than a positive valve seating closure. Port 51 and the supply of fluid to chamber A are thereby gradually restricted as the main plunger 5 approaches its seat 9 although upon closure of port 51, fluid flows from constant pressure chamber 33 through a port 51a and an adjustable needle valve controlled port 51b to gradually close the plunger and thus minimize water hammer or excessive pressure rises in the pipe line upon closure of the check valve. The usual arrangement permits the valve spindle 54 to remain at its maximum adjusted opening until the main plunger 5 approaches its seat at which time the cam rapidly closes the port 51, but it is frequently desirable to have the cam 55 regulate the position of valve 54 throughout the full stroke of main plunger 5.

It will be noted that retarded opening movement is accomplished by controlling the rate of discharge from central chamber A as through reducing valve 44, whereas retarded closing movement is effected by controlling the rate of supply to central chamber A through valve and port 54 and 51. The retarded opening and closing movements are effected by controlling the supply to and discharge from the central chamber rather than by utilizing the discharge from or supply to the annular chamber B. We have found this to be desirable because the volume of water flowing to or from central chamber A is materially greater than the volume for chamber B, and hence the larger volume of water may be controlled with a higher degree of accuracy for a given distance of valve movement than would be the case in attempting to control the smaller volume for chamber B. On other types of valves for example as shown in Fig. 8, the control of rate of stroke can be effected on either chamber A' or B', or, when desired, on both chambers by duplicating the throttling and control devices.

*Combined check and throttling operation.*—For purposes of regulating pressure or quantity of flow, it is sometimes desirable to maintain the conduit valve in various partial open positions while at the same time permitting closure of the valve automatically upon occurrence of a predetermined condition such for example as failure of the pumping operation created usually by failure of pump motor current. Upon reestablishment of such current, or other condition, it is desirable that the valve should open automatically to its previous partial open position. To accomplish this, control valve spindles 30 and 31 are set in the opening position either by action of the solenoid or by manually lifting lever 21 and holding it in opening position by any suitable latch 21' adapted, when free, to swing to and remain in its unlatched position by gravity. If the lever is held up by the latch 21' and should the power be applied to the solenoid, lever 21 will be raised slightly, permitting the latch 21' to swing away by gravity and permit lever 21 to fall freely in the event of power failure. The throttle control valve 47, Fig. 3, is then moved away from its seat 48 to some predetermined position. This is accomplished by unscrewing a threaded connection between threads 65 and 66 formed respectively in the valve housing and on the stem of valve 47. This valve is then moved outwardly to permit a rack 67 thereon to engage a pinion 68. This pinion is secured to a worm gear 69 both of which are suitably journalled in a casing 70. This casing as shown in Fig. 2 is secured to the top of control casing 18 as by common bolts 71 extending from the conduit valve casing 2 upwardly through the two casings 18 and 70 of the control mechanism. A screw 71' is journalled in casing 70 for engagement with gear 69, while a series of annular rack teeth 72 are in alignment with screw 71'. The screw and rack 71' and 72 may be formed in any suitable manner, but for simplicity these elements are in the nature of sleeves held by a nut 73 to a hand wheel shaft 74. Rack 72 engages, Fig. 2, a pinion 76 secured to the plunger and indicator rod 17. Again referring to Fig. 3, it is seen that upon rotation of hand wheel shaft 74, the annular rack teeth 72 by engaging pinion 76 will prevent axial movement of shaft 74, thereby causing screw 71' to rotate gears 69. Thereupon gear 68 is rotated to reciprocate rack 67 and throttle control valve 47 to any desired axial position. It is also seen that any plunger movement will be transmitted through indicator rod 17 and gear 76, thereby to axially shift shaft 74 and cause rotation of gears 69 and 68 and thus move throttle control valve 47. The result is that valve 47 has movement corresponding to that of plunger 5.

Assuming the conduit valve to be closed, then valve 47 will be in some predetermined position forward of a lateral port 78. Upon energization of the solenoid 20 or by manually lifting lever 21, Fig. 5, the control valve spindles 30 and 31 will be moved to the position shown in Fig. 4, whereupon fluid pressure is discharged from central chamber A and admitted to the annular chamber B in the manner as previously described for straight check valve operation. However, as the plunger moves in the opening direction, control valve 47, Fig. 3, is likewise moved outwardly until port 78 is partially uncovered. Thereupon pressure fluid flows, Fig. 3, not only to passage 35 leading to annular chamber B but also through a slotted end 80 of sleeve 49 to the interior thereof and thence through lateral port 78 to build up a back pressure in chamber 42 and internal chamber A to stop opening movement of the plunger. The reducing valve 44 does not have sufficient capacity to permit free discharge of the additional pressure fluid admitted through port 78, and hence said back pressure is built up in central chamber A to limit opening of the plunger. In the event that pump motor current fails or if the lever 21, Fig. 5, is manually depressed, then control valve spindles 30 and 31, Fig. 4, will be reversed so as to effect closure of the conduit valve in the same manner as previously described for straight check valve operation. During such closing movement, throttle control valve 47, Fig. 3, will be moved axially inwardly of sleeve 49 to close lateral port 78 and thus prevent leakage during closure of the valve. Upon reestablishment of the pump motor current or manual lifting of lever 21, the conduit valve will reopen until control valve 47 again uncovers lateral port 78 to increase the pressure within the central chamber A.

From the foregoing disclosure, it is seen that we have provided a very effective means whereby various throttling positions of the plunger may be effected merely by rotation of hand wheel shaft 74 and yet the conduit valve may automatically close from any given throttling position and, during such closure, the valve will be automatically retarded due to cam 55 gradually restricting flow to port 51, Fig. 3.

*Stop valve operation.*—To close the conduit valve, even while the pump and the solenoid 20 are energized, it is only necessary to turn hand wheel shaft 74 in a direction opposite to that for opening, or in other words, to rotate shaft 74 so as to move throttling positioning valve 47 outward to completely uncover the lateral port 78. Hence water may flow into the central chamber A to build up sufficient pressure on the plunger to close the same. Upon closing movement of the plunger, indicator rod 17 will rotate gear 76 and thus tend to axially move rack 72 and screw 71' to move control valve 47 inward to close off port 78, but by continually manually rotating shaft 74 in the opposite direction so as to prevent inward movement of valve 74, then port 78 will remain entirely open and fluid pressure will be admitted to the internal chamber A until the valve reaches its seat. Conversely when it is desired to open the valve, whether or not the pump is running, it is only necessary to have control valve spindles 30 and 31 set for opening the valve and to rotate shaft 74 in its opening direction so as to cover port 78 and thus allow pressure in chamber A to be reduced by discharging through reducing valve 44. A controlled rate of movement of the valve is effected by virtue of the reducing valve 44.

In the modification of Fig. 8, the conduit valve is of the cone or plug type having a casing 80 and a rotatable valve element 81. A piston and cylinder servo-motor 82, corresponding to piston 6 of Fig. 1, is connected to the valve stem 83 through a suitable arm. The control housing is supported in any suitable manner and the valve stem 83, corresponding to indicator rod 17 of Fig. 2, actuates cam 55 and associated control parts.

From the foregoing, it is seen that we have provided a control valve mechanism and assembly that is extremely compact so as to permit mounting the same directly on top of the conduit valve and yet maximum cooperation is effected between the control valves and the conduit valve movement so as to insure a nicety of control in retarding opening and closing movement and at the same time either manual or automatic control of the conduit valve may be effected for either check, throttling or stop valve operation. In accomplishing such multiple operation, a relatively simple arrangement has been provided in that the common hand wheel shaft 74 functions not only to adjust throttling positions of the conduit valve but also to effect stop valve operation. These modes of operation are accomplished while still maintaining a full operative relation between the retarding means for closing and the control valve which functions sometimes as a throttle positioning valve and at other times as a restoring mechanism and at still other times to effect stop valve operation. A further result of our improved combination is that immediately upon failure of pump current, the solenoid 20 is deenergized, thereby instantly initiating closing movement of the conduit valve. Hence the closing movement of the conduit valve can, if desirable, take place before there is any possibility of reversal of flow in the conduit, and this closing movement is continued until the valve is completely closed. In addition the control valves and improved unit housing therefor are so arranged that the valves are readily accessible in addition to being arranged for balanced operation.

It will of course be understood that various changes in details of construction and arrangement of parts may be made by those skilled in the art without departing from the spirit of the invention as set forth in the appended claims.

We claim:

1. The combination comprising a conduit having a movable valve element disposed therein for controlling fluid flow therethrough, means whereby said valve element is adapted to be disposed in a partially closed or throttling position, and means for automatically effecting complete closure of said valve element from said position upon occurrence of a predetermined condition; said latter means including a solenoid which is energized and deenergized in accordance with said condition, means providing opening and closing fluid chambers for said valve element, and control valve mechanism actuated by said solenoid for directly controlling the fluid for each of said chambers.

2. In a valve the combination with a conduit having a tapering contraction, of a conical valve plunger forming a smooth fluidway with said tapering contraction and adapted to seat against the surface of said contraction to close said conduit, and means for moving said valve and holding it at various degrees of opening comprising means for automatically beginning the closing of said valve in advance of reversal of flow in said conduit and continuing said movement with cam-controlled retardation until said valve is closed.

3. In combination, a hydraulic conduit valve comprising a valve casing, a valve element therein, hydraulic actuating means for opening and closing said valve, cam actuated hydraulic control valve mechanism for effecting retarded movement of said conduit valve element, and means for effecting said cam operation in accordance with movement of the conduit valve so as to minimize pressure surges in the conduit.

4. In combination, a hydraulic conduit valve comprising a valve casing and a movable valve element therein, power means for moving said valve element to open and closed positions, cam control means for effecting retarded movement of said valve, and means for effecting said cam operation in accordance with movement of the conduit valve so as to minimize pressure surges in the conduit.

5. In combination, a conduit valve comprising a movable valve element, hydraulic actuating means for opening and closing said valve element, a plurality of retarding control valves, and means whereby said control valves are commonly simultaneously actuated by said conduit valve element to retard opening and closing movements thereof.

6. The combination set forth in claim 5 further characterized in that the control valve actuating means is adapted to render the control valves operative at different times, and means for adjusting the relative timing between said control valves.

7. The combination set forth in claim 5 further characterized in that one of said control valves is actuated by a rotatable cam, means for operatively connecting said cam to said conduit valve element, and means whereby the second of said control valves is operatively connected to said cam connecting means thereby to effect said simultaneous operation of said control valves.

8. The combination set forth in claim 5 further characterized in that one of said control valves is actuated by a rotatable cam, means for operatively connecting said cam to said conduit valve element, and means whereby the second of said control valves is operatively connected to said cam connecting means thereby to effect said simultaneous operation of said control valves, said operative connection for the second control valve having provision to effect relative timing adjustment between said control valves by adjusting said second valve without adjustment of the first valve.

9. In combination, a conduit valve comprising a valve element, hydraulic means for moving the same, a plurality of oppositely movable main control valves to effect opening and closing of said valve element, and a plurality of other control valves one of which is adapted to retard opening movement of the conduit valve and the other the closing movement thereof.

10. In combination, a conduit valve mechanism comprising a movable valve element, hydraulic means for opening and closing said valve, a plurality of main control valves, a solenoid for actuating the same, valve mechanism through which fluid flows for said hydraulic means and adapted to retard movement of said conduit valve element when near the end of its stroke, and means whereby said latter control valve mechanism is actuated in accordance with movement of said conduit valve element.

11. In combination, a conduit valve mechanism comprising a movable valve element, hydraulic opening and closing means for said valve element, main control valve mechanism whereby fluid pressure is admitted to said opening means and exhausted from said closing means during opening movement of the valve element, and variably controlled means operated in accordance with movement of said valve element for retarding said opening movement by the admission of fluid pressure to said closing means.

12. The combination set forth in claim 11 further characterized by the provision of means whereby fluid pressure continues to exhaust from said closing chamber while fluid pressure is admitted thereto to effect said retarding action.

13. In combination, a conduit valve comprising a casing and a valve element therein, hydraulic means for moving said valve element, a control housing mounted directly on said valve casing, a plurality of main control valves disposed therein in one plane, a solenoid for actuating the same, retarding control valve mechanism also disposed in said control housing but in another plane, and means operatively connecting said latter control valves with said valve element to effect retarded movement of said valve element in accordance with opening and closing positions thereof.

14. A conduit valve mechanism comprising, in combination, a movable valve element, opening and closing hydraulic actuating means therefor, valve mechanism for initiating the opening and closing operation of said actuating means, and means for effecting different throttling positions of said valve element including a member having a port and a throttle control valve movable in said member to normally partially cover said port when the valve is in any one of its throttling positions.

15. The combination set forth in claim 14 further characterized by the provision of means whereby said throttle control valve may be shifted in an opening or closing direction over said port thereby to effect opening or closing movement of said valve element.

16. The combination set forth in claim 14 further characterized by the provision of means for actuating said throttle control valve in accordance with movement of said valve element, whereby said valve element is moved until subjected to balanced hydraulic pressures.

17. The combination set forth in claim 14 further characterized by the provision of means for actuating said throttle control valve in accordance with movement of said valve element, whereby said valve element is moved until subjected to balanced hydraulic pressures, and means for manually superimposing movement upon said throttle control valve in advance of being moved by said valve element.

SAMUEL LOGAN KERR.
ANDREW GREIG.